US009031320B2

(12) United States Patent
Tsai

(10) Patent No.: US 9,031,320 B2
(45) Date of Patent: May 12, 2015

(54) DYNAMIC RANGE COMPRESSION METHOD FOR IMAGE AND IMAGE PROCESSING DEVICE

(75) Inventor: Chi-Yi Tsai, New Taipei (TW)

(73) Assignee: Tamkang University, New Taipei (TW)

( * ) Notice: Subject to any disclaimer, the term of this patent is extended or adjusted under 35 U.S.C. 154(b) by 148 days.

(21) Appl. No.: 13/615,635

(22) Filed: Sep. 14, 2012

(65) Prior Publication Data

US 2014/0003715 A1 Jan. 2, 2014

(30) Foreign Application Priority Data

Jun. 29, 2012 (TW) .............................. 101123479 A

(51) Int. Cl.
G06K 9/00 (2006.01)
H04N 19/98 (2014.01)
H04N 19/80 (2014.01)

(52) U.S. Cl.
CPC ............... *H04N 19/98* (2014.11); *H04N 19/80* (2014.11)

(58) Field of Classification Search
CPC ........... G06T 2207/20208; G06T 2207/20012; G06T 5/007
See application file for complete search history.

(56) References Cited

U.S. PATENT DOCUMENTS

| 7,986,351 | B2 * | 7/2011 | Jiang et al. ..................... 348/234 |
| 8,120,679 | B2 * | 2/2012 | Ishiga ............................ 348/252 |
| 8,248,486 | B1 * | 8/2012 | Ward et al. .................. 348/223.1 |
| 8,447,132 | B1 * | 5/2013 | Galil ............................ 382/274 |
| 8,665,942 | B2 * | 3/2014 | Segall ........................... 375/240 |
| 2002/0171663 | A1 * | 11/2002 | Kobayashi et al. ........... 345/600 |
| 2005/0031199 | A1 * | 2/2005 | Ben-Chorin et al. ......... 382/162 |
| 2008/0080784 | A1 * | 4/2008 | Ozdemir ....................... 382/274 |
| 2008/0107360 | A1 * | 5/2008 | Yamashita et al. ............ 382/313 |
| 2009/0295937 | A1 * | 12/2009 | Sato et al. ................. 348/222.1 |
| 2010/0157078 | A1 * | 6/2010 | Atanassov et al. ......... 348/222.1 |
| 2010/0316289 | A1 * | 12/2010 | Tsai ............................. 382/165 |
| 2011/0025890 | A1 * | 2/2011 | Yamashita et al. ............ 348/255 |
| 2012/0002082 | A1 * | 1/2012 | Johnson et al. ............... 348/234 |

OTHER PUBLICATIONS

Meylan et al., Bio-Inspired Color Image Enhancement, 2004, Proceedings of SPIE: Human Vision and Electronic Imaging.*
Mantiuk et al., A Perceptual Framework for Contrast Processing of High Dynamic Range Images, 2005, Proc. of Second Symposium on Applied Perception in Graphics and Visualization, pp. 87-94.*
Zhang et al., Adaptive local contrast enhancement for the visualization of high dynamic range images, 2008, 19th International Conference on Pattern Recognition, pp. 1-4.*

(Continued)

*Primary Examiner* — Vu Le
*Assistant Examiner* — Guillermo Rivera-Martinez
(74) *Attorney, Agent, or Firm* — Jianq Chyun IP Office

(57) ABSTRACT

An image dynamic range compression method for an image processing device is provided. The method includes receiving a plurality of input pixels which include a first input pixel, obtaining a luminance pixel value of each of the input pixels, executing a filter execution according to the luminance pixel values of the input pixels to obtain a filter result corresponding to the first input pixel, transforming the filter result into a function result according to a function, and obtaining an output luminance pixel value of the first input pixel according to the luminance pixel value of the first input pixel and a transforming ratio between the function result and the filter result. Accordingly, the method reserves the details in an image and color information, and increases the execution speed.

14 Claims, 4 Drawing Sheets

(56) References Cited

OTHER PUBLICATIONS

Jobson et al., "A Multiscale Retinex for Bridging the Gap Between Color Images and the Human Observation of Scenes", IEEE Transactions on Image Processing, 1997, vol. 6, No. 7, p. 965-976.

Fattal et al., "Gradient Domain High Dynamic Range Compression", ACM Transactions on Graphics, 2002, vol. 21, No. 3, p. 249-256.

Reinhard et al., "Photographic tone reproduction for digital images", Proc. SIGGRAPH2002, 2002, p. 267-277.

Monobe et al., "Dynamic range compression preserving local image contrast for digital video camera", IEEE Trans. on Consumer Electronics, 2005, vol. 51, No. 1, p. 1-10.

Bennett et al., "Video enhancement using per-pixel virtual exposures", ACM Transactions on Graphics, 2005, vol. 24, No. 3, p. 845-852.

Bertalmio et al., "Perceptual color correction through variational techniques",IEEE Transactions on Image Processing, 2007, vol. 16, No. 4, p. 1058-1072.

Palma-Amestoy et al., "A perceptually inspired variational framework for color enhancement",IEEE Transactions on Pattern Analysis and Machine Intelligence, 2009, vol. 31, No. 3, p. 458-474.

Horiuchi et al., "HDR image quality enhancement based on spatially variant retinal response",EURASIP Journal on Image and Video Processing, 2010, vol. 2010, Article ID 438958, p. 1-12.

Chen et al., "Natural enhancement of color image", EURASIP Journal on Image and Video Processing, 2010, vol. 2010, Article ID 175203, p. 1-20.

Choudhury et al., "Perceptually motivated automatic color contrast enhancement based on color constancy estimation",EURASIP Journal on Image and Video Processing, 2010, vol. 2010, Article ID 837237, p. 1-23.

Hu et al., "Using adaptive tone mapping to enhance edge-preserving color image automatically", EURASIP Journal on Image and Video Processing, 2010, vol. 2010, Article ID 137134, p. 1-12.

Tsai et al., "A novel simultaneous dynamic range compression and local contrast enhancement algorithm for digital video cameras",EURASIP Journal on Image and Video Processing, 2011, vol. 2011:6, p. 1-19.

Tsai et al.,"A Fast Dynamic Range Compression With Local Contrast Preservation Algorithm and Its Application to Real-Time Video Enhancement",IEEE Transactions on Multimedia, 2012, vol. 14, No. 4, p. 1140-1152.

\* cited by examiner

DYNAMIC RANGE COMPRESSION METHOD FOR IMAGE AND IMAGE PROCESSING DEVICE

CROSS-REFERENCE TO RELATED APPLICATION

This application claims the priority benefit of Taiwan application serial no. 101123479, filed on Jun. 29, 2012. The entirety of the above-mentioned patent application is hereby incorporated by reference herein and made a part of this specification.

BACKGROUND

1. Field of the Invention

The invention relates to an image processing method, and more particularly to, a dynamic range compression method for an image and an image processing device.

2. Description of Related Art

An image may be expressed with a plurality of pixels, and each pixel may include pixel values which represent different colors. A dynamic range of the image represents a ratio of a maximum pixel value and a minimum pixel value which can be generated (or recognized). In general, the dynamic range in a natural environment is greater than the dynamic range of a human eye. Whereas, the dynamic range of the human eye is greater than a general image capture device. Therefore, when an ambient light is uneven, an image displayed on a display unit may not be the image that is expected to be seen by the human eye. For example, a backlighting situation during a photo shoot is generated due to a lack of the dynamic range of the display unit. Thus, displaying the image with a high dynamic range in the display unit with a low dynamic range or enhancing an image quality of the image with the low dynamic range has become an issue of concern for researcher of the related field.

SUMMARY OF THE INVENTION

The embodiments of the invention provide a dynamic range compression method and an image processing device for enhancing a quality of an image.

In an embodiment of the invention, an image dynamic range compression method for an image processing device is provided. The method includes: receiving a plurality of input pixels, wherein the input pixels include a first input pixel; obtaining a luminance pixel value of each of the input pixels; executing a filter execution according to the luminance pixel values of the input pixels to obtain a filter result corresponding to the first input pixel; transforming the filter result into a function result according to a function; and obtaining an output luminance pixel value of the first input pixel according to the luminance pixel value of the first input pixel and a transforming ratio between the function result and the filter result.

In an embodiment, the step of obtaining the output luminance pixel value of the first input pixel according to the luminance pixel value of the first input pixel and the transforming ratio between the function result and the filter result includes: obtaining a multiplication result by multiplying the transforming ratio with the luminance pixel value of the first input pixel; and adjusting the multiplication result according to a maximum value and a minimum value for obtaining the output luminance pixel value of the first input pixel, wherein the output luminance pixel value of the first input pixel is ranged between the maximum value and the minimum value.

In an embodiment, the step of transforming the filter result into the function result according to the function includes: obtaining a first regularization parameter according to the filter result, an input pixels brightness maximum value, a minimum parameter, and a maximum parameter, wherein the minimum parameter and the maximum parameter are both greater than 0; and substituting the luminance pixel value of the first input pixel and the first regularization parameter into a hyperbolic tangent function, and obtaining the function result according to the output of the hyperbolic tangent function.

In an embodiment, the input pixels are comprised in an image, and the image comprises a plurality of columns and a plurality of rows. The step of obtaining the luminance pixel value of each of the input pixels includes obtaining the luminance pixel value according to equations (1)~(4).

$$L_{in}(x,y)=p_1 \cdot Y_{in}(x,y)+\max[\Delta C_r(x,y),\Delta C_{rb}(x,y), \Delta C_{rb}(x,y)] \qquad (1)$$

$$\Delta C_r(x,y)=p_2 \cdot C_{in}^r(x,y)-p_3 \qquad (2)$$

$$\Delta C_{rb}(x,y)=p_4-p_5 \cdot C_{in}^b(x,y)-p_6 \cdot C_{in}^r(x,y) \qquad (3)$$

$$\Delta C_b(x,y)=p_7 \cdot C_{in}^b(x,y)-p_8 \qquad (4)$$

wherein x and y are non-negative integers, and $p_1$~$p_8$ are real numbers. $L_{in}(x,y)$ represents the luminance pixel value of the input pixel at the $x^{th}$ row and the $y^{th}$ column in the image. $Y_{in}(x,y)$ represents a Y pixel value, in YCbCr color space, of the input pixel at the $X^{th}$ row and the $y^{th}$ column in the image. $C_{in}^r(x,y)$ represents a Cr pixel value, in YCbCr color space, of the input pixel at the $x^{th}$ row and the $y^{th}$ column in the image. $C_{in}^b(x,y)$ represents a Cb pixel value, in YCbCr color space, of the input pixel at the $x^{th}$ row and the $y^{th}$ column in the image.

In an embodiment, the dynamic compression method further includes obtaining an output result of each of the input pixels according to equation (5).

$$Y_{out}(x,y)=\{w\alpha(x,y)+(1-w)[p_9 \cdot \alpha(x,y)+p_{10}]\}Y_{in}(x,y)-16w[\alpha(x,y)-1] \qquad (5),$$

wherein w is a real number greater than 0 and smaller than 1. $p_9$ and $p_{10}$ are real numbers. $\alpha(x,y)$ is a ratio between the output luminance pixel value and the luminance pixel value of the input pixel at the $x^{th}$ row and the $y^{th}$ column in the image. $Y_{in}(x,y)$ represents the Y pixel value, in YCbCr color space, of the input pixel at the $x^{th}$ row and the $y^{th}$ column in the image. $Y_{out}(x,y)$ is an output result of the input pixel at the $x^{th}$ row and the $y^{th}$ column in the image.

In an embodiment, the dynamic range compression method further includes obtaining an output chroma pixel value of the first input pixel according to equation (6).

$$C_{out}^i(x,y)=[w\alpha(x,y)+(1-w)]C_{in}^i(x,y)-128w[\alpha(x,y)-1] \qquad (6),$$

wherein $C_{in}^i(x,y)$ represents the Cb pixel value or the Cr pixel value, in YCbCr color space, of the input pixel at the $x^{th}$ row and the $y^{th}$ column in the image. $C_{out}^i(x,y)$ represents a Cb output chroma pixel value or a Cr output chroma pixel value, in YCbCr color space, of the input pixel at the $x^{th}$ row and the $y^{th}$ column in the image.

In an embodiment, the dynamic range compression method further includes establishing a luminance lookup table according to equation (5), wherein input indexes of the luminance lookup table are the filter result and the Y pixel values of the input pixels in YCbCr color space; and establishing a color lookup table according to equation (6), wherein input indexes of the color lookup table are the filter result and the Cr pixel values or the Cb pixel values, in YCbCr color space, of the input pixels. wherein steps of obtaining the output luminance pixel value of the first input pixel according to the luminance pixel value of the first input pixel and the transforming ratio between the function result and the filter result include: obtaining the output result of the first input pixel according to the luminance lookup table, the luminance pixel value of the first input pixel and the filter result; and obtaining the Cb output chroma pixel value or the Cr output chroma pixel value of the first input pixel according to the color lookup table, the Cr pixel value or the Cb pixel value, in YCbCr color space, of the first input pixel and the filter result.

From another point of view, an embodiment of the invention provides an image processing device including a luminance capture circuit, a filter execution circuit and a pixel value adjustment circuit. The luminance capture circuit is configured to receive a plurality of input pixels, which includes a first input pixel. The luminance capture circuit is also configured to obtain an output luminance pixel value of the first input pixel. The filter execution circuit is coupled to the luminance capture circuit, and is configure to execute a filter execution according to the luminance pixel values of the input pixels to obtain a filter result corresponding to the first input pixel. The pixel value adjustment circuit is coupled to the filter execution circuit. The pixel value adjustment circuit is configured to transform the filter result into a function result according to a function, and to obtain an output luminance pixel value of the first input pixel according to the luminance pixel value of the first input pixel and a transforming ratio between the function result and the filter result.

In an embodiment, the pixel value adjustment circuit is also configured to obtain a multiplication result by multiplying the transforming ratio with the luminance pixel value of the first input pixel, and to adjust the multiplication result according to a maximum value and a minimum value for obtaining the output luminance pixel value of the first input pixel, wherein the output luminance pixel value of the first input pixel is ranged between the maximum value and the minimum value.

In an embodiment, the pixel value adjustment circuit is further configured to obtain a first regularization parameter according to the filter result, an input pixels brightness maximum value, a minimum parameter, and a maximum parameter, wherein the minimum parameter and the maximum parameter are both greater than 0. The pixel value adjustment circuit is also configured to substitute the luminance pixel value of the first input pixel and the first regularization parameter into a hyperbolic tangent function, and obtain the function result according to the output of the hyperbolic tangent function.

In an embodiment, the pixel value adjustment circuit is also configured to obtain the luminance pixel value of each of the input pixels according to equations (1)~(4).

$$L_{in}(x,y)=p_1 \cdot Y_{in}(x,y)+\max[\Delta C_r(x,y), \Delta C_{rb}(x,y), \Delta C_b(x,y)] \quad (1)$$

$$\Delta C_r(x,y)=p_2 \cdot C_{in}^r(x,y)-p_3 \quad (2)$$

$$\Delta C_{rb}(x,y)=p_4-p_5 \cdot C_{in}^b(x,y)-p_6 \cdot C_{in}^r(x,y) \quad (3)$$

$$\Delta C_b(x,y)=p_7 \cdot C_{in}^b(x,y)-p_8 \quad (4)$$

wherein x and y are non-negative integers, and $p_1$~$p_8$ are real numbers. $L_{in}(x,y)$ represents the luminance pixel value of the input pixel at the $x^{th}$ row and the $y^{th}$ column in the image. $Y_{in}(x,y)$ represents a Y pixel value, in YCbCr color space, of the input pixel at the $x^{th}$ row and the $y^{th}$ column in the image. $C_{in}^r(x,y)$ represents a Cr pixel value, in YCbCr color space, of the input pixel at the $x^{th}$ row and the $y^{th}$ column in the image. $C_{in}^b(x,y)$ represents a Cb pixel value, in YCbCr color space, of the input pixel at the $x^{th}$ row and the $y^{th}$ column in the image.

In an embodiment, the 的 pixel value adjustment circuit is also configured to obtain an output result of each of the input pixels according to equation (5).

$$Y_{out}(x,y)=\{w\alpha(x,y)+(1-w)[p_9 \cdot \alpha(x,y)+p_{10}]\}Y_{in}(x,y)-16w[\alpha(x,y)-1] \quad (5)$$

wherein w is a real number greater than 0 and smaller than 1. $p_9$ and $p_{10}$ are real numbers. $\alpha(x,y)$ is a ratio between the output luminance pixel value and the luminance pixel value of the input pixel at the $x^{th}$ row and the $y^{th}$ column in the image. $Y_{in}(x,y)$ represents the Y pixel value, in YCbCr color space, of the input pixel at the $x^{th}$ row and the $y^{th}$ column in the image. $Y_{out}(x,y)$ is the output result of the input pixel at the $x^{th}$ row and the $y^{th}$ column in the image.

In an embodiment, the pixel value adjustment circuit is further configured to obtain an output chroma pixel value of the first input pixel according to equation (6).

$$C_{out}^i(x,y)=[w\alpha(x,y)+(1-w)]C_{in}^i(x,y)-128w[\alpha(x,y)-1] \quad (6)$$

wherein $C_{in}^i(x,y)$ represents the Cb pixel value or the Cr pixel value, in YCbCr color space, of the input pixel at the $x^{th}$ row and the $y^{th}$ column in the image. $C_{out}^i(x,y)$ represents a Cb output chroma pixel value or a Cr output chroma pixel value, in YCbCr color space, of the input pixel at the $x^{th}$ row and the $y^{th}$ column in the image.

In an embodiment, the pixel value adjustment circuit includes a luminance lookup table and a color lookup table. The luminance lookup table is established according to equation (5). Wherein, input indexes of the luminance lookup table are the filter result and the Y pixel values, in YCbCr color space, of the input pixels. The output of the luminance lookup table is the output result of the input pixels. The color lookup table is established according to equation (6). Wherein, input indexes of the color lookup table are the filter result and the Cr pixel values or the Cb pixel values, in YCbCr color space, of the input pixels. The output of the color lookup table is the Cb output chroma pixel value or the Cr output chroma pixel value of the input pixels.

According to the foregoing, the dynamic range compression method and the image processing device provided in the embodiments of the invention may reserve details and color information of the image, and may use the lookup tables to speed up.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

First Embodiment

Figure 1:
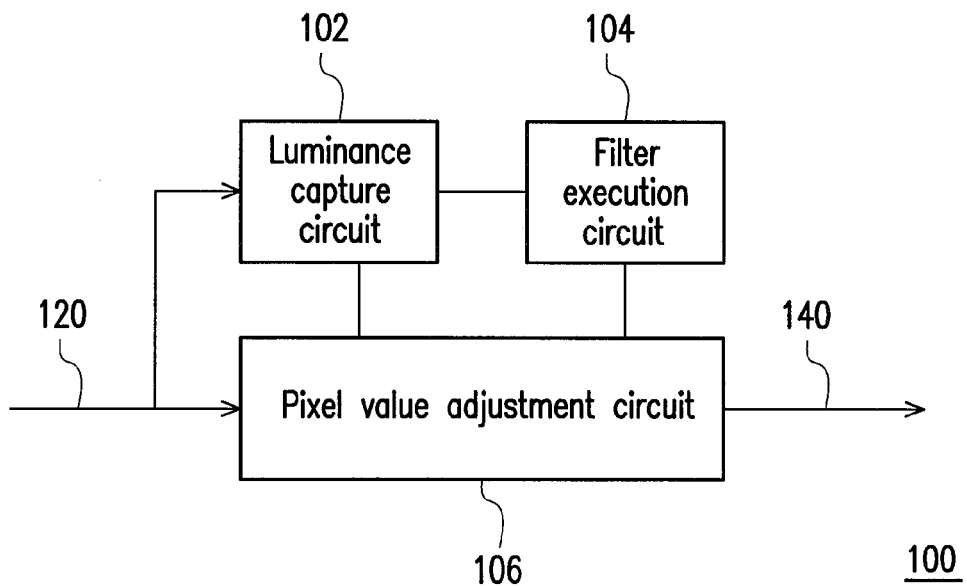
FIG. 1 is a block diagram schematically illustrating an image processing device according to an exemplary embodiment.

FIG. 1 is a block diagram schematically illustrating an image processing device 100 according to an exemplary embodiment.

Referring to FIG. 1, the image processing device 100 receives an image 120 and outputs an image 140. The image processing device 100 is configured to increase a contrast of the image 120, reserve details in the image 120, and retain color information in the image 120, and a result thereof is the image 140. For instance, the image processing device 100 is a personal computer, a notebook, a digital camera, a digital camcorder, a network camcorder, a smart phone, a tablet PC, or a scanner, but the invention is not limited thereto.

The image processing device 100 includes a luminance capture circuit 102, a filter execution circuit 104 and a pixel value adjustment circuit 106. For instance, the luminance capture circuit 102, the filter execution circuit 104 and the pixel value adjustment circuit 106 may be implemented as integrated circuits, which respectively include a plurality of logic gates.

The luminance capture circuit 102 is configured to capture pixel values in the image 120. For instance, the image 120 includes a plurality of input pixels, and each of the input pixels includes at least one pixel value. The luminance capture circuit 102 is also configured to transform the color spaces of the pixel values.

The filter execution circuit 104 is coupled to the luminance capture circuit 102, and is configured to execute a filter execution on the pixel values. For instance, the filter execution is an average operation, but the invention is not limited thereto.

The pixel value adjustment circuit 106 is coupled to the luminance capture circuit 102 and the filter execution circuit 104, and is configured to adjust the pixel values in the image 120, and to generate the image 140.

The luminance capture circuit 102, the filter execution circuit 104 and the pixel value adjustment circuit 106 are described as follows.

Figure 2:
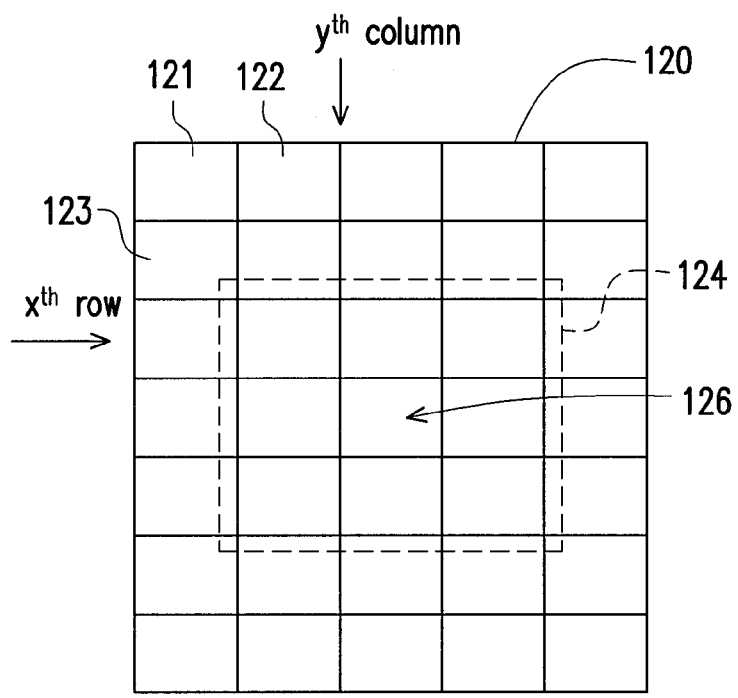
FIG. 2 is a diagram schematically illustrating an example of an image according to an exemplary embodiment.

FIG. 2 is a diagram schematically illustrating an example of an image according to an exemplary embodiment.

Referring to FIG. 2, the image 120 includes the plurality of input pixels, and the input pixels are arranged in a matrix in a manner of columns and rows. For example, an input pixel 121 is the input pixel at the $1^{st}$ row and the $1^{st}$ column in the image 120, an input pixel 122 is at the $1^{st}$ row and $2^{nd}$ column in the image 120, an input pixel 123 is at the $2^{nd}$ row and $1^{st}$ column in the image 120, and so forth. Each of the input pixels includes at least a pixel value. For instance, the image 120 is a color image in YCbCr color space, and each of the input pixels includes a Y pixel value, a Cb pixel value and a Cr pixel value. Nevertheless, in other embodiments, each of the input pixels may also include a red pixel value, a green pixel value and a blue pixel value, and the invention is not limited thereto.

The luminance capture circuit 102 receives the input pixels in the image 120 and obtains the luminance pixel value of each of the input pixels. For instance, the luminance pixel value is a V pixel value in HSV (hue, saturation, value) color space. Nevertheless, in other embodiments, the luminance pixel value may also be the Y pixel value in YCbCr color space, or a L pixel value in Lab color space, and the invention is not limited thereto.

The filter execution circuit 104 executes a filter execution according to the luminance pixel values of the input pixels to obtain a filter result. For instance, the filter execution circuit 104 executes the filter execution according to a filter 124. In present embodiment, the filter 124 is a filter to calculate an average value of the luminance pixel values of the input pixels within a range of the filter 124 by using an input pixel 126 (aka., the first input pixel) as the center, and the average value generated according to the filter 124 is namely the filter result. In other embodiments, the luminance pixel value of each of the input pixels in the filter 124 may be multiplied by a weight; or, the filter 124 may be a Gaussian filter or other types of low-pass filter, but the invention is not limited thereto.

The pixel value adjustment circuit 106 transforms the filter result into a function result according to a function. For instance, the function is a continuous and first-order differentiable function, but the invention is not limited thereto. The pixel value adjustment circuit 106 obtains an output luminance pixel value of the input pixel 126 according to the luminance pixel value of the input pixel 126 and a transforming ratio between the function result and the filter result. After the output luminance pixel value of each of the input pixels is obtained, the pixel value adjustment circuit 106 obtains the image 140 according to the output luminance pixel values.

For example, the pixel value adjustment circuit 106 obtains the output luminance pixel values according to the following equation (1) and equation (2).

$$L_{out}(x, y) = \{r(x, y)L_{in}(x, y)\}_0^1 \quad (1)$$

$$r(x, y) = \frac{T[L_{in}^{avg}(x, y)]}{L_{in}^{avg}(x, y)} \quad (2)$$

Wherein, $L_{in}(x,y)$ represents the luminance pixel value of the input pixel at the $x^{th}$ row and the $y^{th}$ column in the image 120. $L_{out}(x,y)$ is the output luminance pixel of the input pixel at the $x^{th}$ row and the $y^{th}$ column in the image 120. $L_{in}^{avg}(x,y)$ is the filter result corresponding to the input pixel at the $x^{th}$ row and the $y^{th}$ column in the image 120, and is the average value in the present embodiment. T[ ] is the continuous and first-order differentiable function. $r(x,y)$ is the transforming ratio between the function result and the filter result. $\{L\}_0^1$ represents an operation which limits the value of L between a maximum value (viz., 1) and a minimum value (viz., 0).

In other words, in an embodiment, the pixel value adjustment circuit 106 multiplies the transforming ratio $r(x,y)$ with the luminance pixel value in $L_{in}(x,y)$ of the input pixel 126 to obtain a multiplication result. Moreover, the pixel value adjustment circuit 106 adjusts the multiplication result according to the maximum value and the minimum value in order to obtain the output luminance pixel value $L_{out}(x,y)$ of the input pixel 126. Wherein, the output luminance pixel value of the input pixel 126 is ranged between the maximum value and the minimum value.

In an embodiment, the function T[ ] includes a hyperbolic tangent function. Specifically, the function T[ ] may be expressed with the following equations (3)~(6).

$$T[L_{in}(x, y)] = N(x, y)\tanh\left(\frac{L_{in}(x, y)}{m(x, y)}\right) \quad (3)$$

$$m(x, y) = L_{in}^{avg}(x, y)s + m_{min} \quad (4)$$

-continued $$N(x, y) = [\tanh(L_{in}^{max}/m(x, y))]^{-1} \quad (5)$$

$$s = (L_{in}^{max})^{-1}(m_{max} - m_{min}) \quad (6)$$

Wherein, $T[L_{in}(x,y)]$ is the function result corresponding to the input pixel at the $x^{th}$ row and the $y^{th}$ column in the image 120. Tan h ( ) is the hyperbolic tangent function. $L_{in}^{max}$ is a maximum luminance pixel value, and represents the maximum of the luminance pixel value which may be included by all the input pixels in the image 120. For instance, when each of the luminance pixel values is expressed with 8 bits, $L_{in}^{max}$ is 255. Nevertheless, in other embodiments, $L_{in}^{max}$ may also be 4095 or 65535, and the invention is not limited thereto. $m_{min}$ and $m_{max}$ respectively are a minimum parameter and a maximum parameter which have a value greater than 0. Users may adjust $m_{min}$ and $m_{max}$ to generate adjustment results of different dynamic ranges; for instance, $m_{min}$ and $m_{max}$ are 10 and 255, but the invention does no limit the values of $m_{min}$ and $m_{max}$.

In other words, the pixel value adjustment circuit 106 obtains a first regularization parameter m(x,y) according to the filter result $L_{in}^{avg}(x,y)$ corresponding to the input pixel 126, the maximum luminance pixel value $L_{in}^{max}$, the minimum parameter mmin and the maximum parameter mmax. In addition, the pixel value adjustment circuit 106 substitutes the luminance pixel value $L_{in}(x,y)$ of the input pixel 126 and the first regularization parameter m(x,y) into the hyperbolic tangent function, and obtain the function result according to the output of the hyperbolic tangent function.

If the equations (3)~(5) are substituted into the equation (1), the following equations (7) and (8) may be obtained.

$$L_{out}(x, y) = \left\{ \frac{N(x, y) L_{in}(x, y)}{L_{in}^{avg}(x, y) + \varepsilon} \tanh\left(\frac{L_{in}^{avg}(x, y) + \varepsilon}{m(x, y)}\right) \right\}_0^1 \quad (7)$$

$$r(x, y) = \frac{N(x, y)}{L_{in}^{avg}(x, y) + \varepsilon} \tanh\left(\frac{L_{in}^{avg}(x, y) + \varepsilon}{m(x, y)}\right) \quad (8)$$

Wherein, $\varepsilon$ is a smaller number greater than 0 for avoiding an operation of dividing by 0. In an embodiment, the image 140 generated according to the equation (7) may achieve an effect of dynamic range compression and reserve the details in the image 140.

Noteworthily, in an embodiment, the luminance pixel value is the V pixel value in HSV color space. However, the image 120 is in YCbCr color space. Therefore, the luminance capture circuit 102 transforms the Y pixel value in YCbCr color space into the V pixel value in HSV color space.

Figure 3:
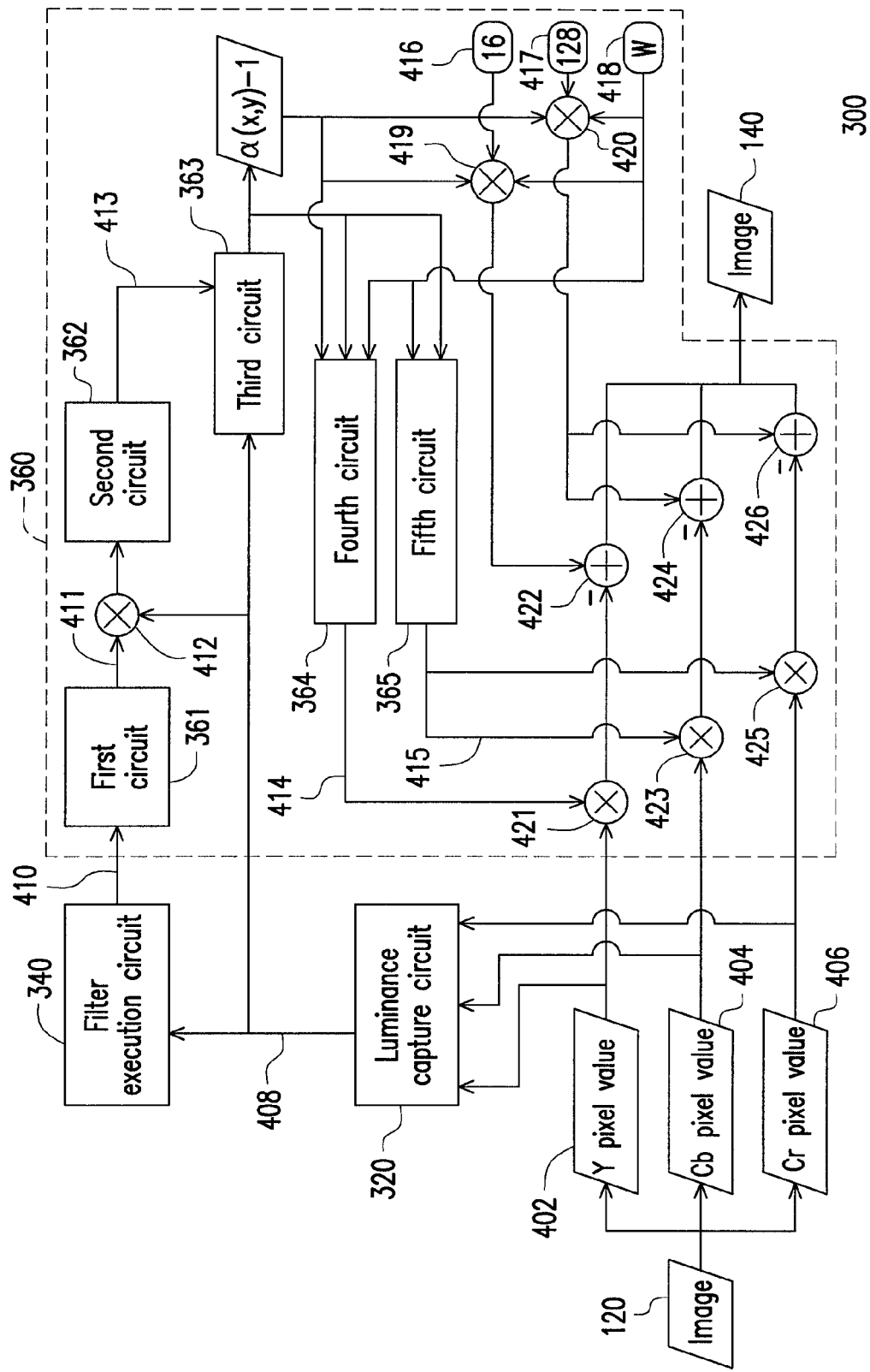
FIG. 3 is a block diagram schematically illustrating an image processing device according to a first embodiment.

FIG. 3 is a block diagram schematically illustrating an image processing device 300 according to a first embodiment.

The image processing device 300 includes a luminance capture circuit 320, a filter execution circuit 340 and a pixel value adjustment circuit 360. The pixel value adjustment circuit 360 includes a first circuit 361, a second circuit 362, a third circuit 363, a fourth circuit 364, and a fifth circuit 365.

In the embodiment illustrated in FIG. 3, the image 120 is in YCbCr color space, and thus the image 120 may be divided as Y pixel values 402, Cb pixel values 404 and Cr pixel values 406. The luminance capture circuit 320 obtains the V pixel value (viz., a luminance pixel value 408 of the input pixel) in HSV color space according to the pixel value in YCbCr color space. For example, the luminance capture circuit 102 may be transformed according to the following equations (9)~(12).

$$L_{in}(x,y)=p_1 \cdot Y_{in}(x,y)+\max[\Delta C_r(x,y), \Delta C_{rb}(x,y), \Delta C_b(x,y)] \quad (9)$$

$$\Delta C_r(x,y)=p_2 \cdot C_{in}^r(x,y)-p_3 \quad (10)$$

$$\Delta C_{rb}(x,y)=p_4-p_5 \cdot C_{in}^b(x,y)-p_6 \cdot C_{in}^r(x,y) \quad (11)$$

$$\Delta C_b(x,y)=p_7 \cdot C_{in}^b(x,y)-p_8 \quad (12)$$

$L_{in}(x,y)$ represents the V pixel value (viz., the luminance pixel value 408), in HSV color space, of the input pixel at the $x^{th}$ row and the $y^{th}$ column in the image 120. $Y_{in}(x,y)$ represents the Y pixel value 402, in YCbCr color space, of the input pixel at the $x^{th}$ row and the $y^{th}$ column in the image 120. $C_{in}^r(x,y)$ represents the Cr pixel value 406, in YCbCr color space, of the input pixel at the $x^{th}$ row and the $y^{th}$ column in the image 120. $C_{in}^b(x,y)$ represents the Cb pixel value 404, YCbCr color space, of the input pixel at the $x^{th}$ row and the $y^{th}$ column in the image 120. $p_1$~$p_8$ are real numbers, such that $p_1=1.164$, $p_2=1.596$, $p_3=222.912$, $p_4=135.488$, $p_5=0.391$, $p_6=0.813$, $p_7=2.018$, and $p_8=276.928$. Nevertheless, in other embodiment, $p_1$~$p_8$ may be other values (e.g., values with more or less bits of decimal point accuracy), and the invention is not limited thereto.

In another embodiment, the luminance capture circuit 102 may also firstly transform the pixel value in YCbCr color space into a pixel value in RGB color space, and then transform the pixel value in RGB color space into the pixel value in HSV color space, but the invention is not limited thereto.

The filter execution circuit 340 generates a filter result 410 according to the luminance pixel value 408; nevertheless, the description of the filter execution is already stated in the above, and is not to be repeated herein.

Next, the first circuit 361 obtains a transforming ratio 411 between the function result and the filter result 410 according to the equations (1) and (2). The transforming ratio 411 and the luminance pixel value 408 undergoes an operation of a multiplier 412, and the second circuit 362 limits an output of the multiplier 412 between the maximum value (e.g., 1) and the minimum value (e.g., 0). The second circuit 362 penetrates an output luminance pixel value 413 of the input pixels.

The third circuit 363 obtains a ratio by dividing the output luminance pixel value 413 with the luminance pixel value 408. For example, the third circuit 363 obtains the ratio (expressed as $\alpha(x,y)$) according to the following equation (13).

$$\alpha(x, y) = \frac{L_{out}(x, y)}{L_{in}(x, y)} \quad (13)$$

The fourth circuit 364 obtains a luminance adjustment ratio 414 according to the following equation (14).

$$S_Y(x,y)=w\alpha(x,y)+(1-w)[p_9 \cdot \alpha(x,y)+p_{10}] \quad (14)$$

Wherein, $S_Y(x,y)$ is the luminance adjustment ratio 414 corresponding to the input pixel at the $x^{th}$ row and the $y^{th}$ column in the image 120. $\alpha(x,y)$ is a ratio between the output luminance pixel value $L_{out}(x,y)$ and the luminance pixel value $L_{in}(x,y)$ of the input pixel at the $x^{th}$ row and the $y^{th}$ column in the image 120. w is a real number greater than 0 and smaller than 1, but the invention does not limit the value of w. $p_9$ and $p_{10}$ are real numbers, such that $p_9=0.8591$ and $p_{10}=0.1409$. Nevertheless, in other embodiments, $p_9$ and $p_{10}$ may be other values, and the invention is not limited thereto.

On the other hand, the fifth circuit 365 obtains a color adjustment ratio 415 according to the following equation (15).

$$S_C(x,y)=w\alpha(x,y)+(1-w) \quad (15)$$

Wherein, $S_c(x,y)$ is the color adjustment ratio 415 corresponding to the input pixel at the $x^{th}$ row and the $y^{th}$ column in the image 120.

It is known from equations (14) and (15) that the fourth circuit 364 and the fifth circuit 365 may simultaneously use both a plurality of constants and a plurality of variables. Therefore, in the present embodiment, the constants may be additionally stored in a non-volatile memory as constants 416~418. Moreover, multipliers 419 and 420 may also be configured to speed up an operation speed of the pixel value adjustment circuit 106.

Next, the multiplier 421 multiplies the Y pixel value 402 with the luminance adjustment ratio 414, and the multiplied result is then undergoes an operation of a subtractor 422, so as to obtain an output result corresponding to the Y pixel value 402. Similarly, the multiplier 423 multiplies the Cb pixel value 404 with the color adjustment ratio 415, and the multiplied result is then undergoes an operation of a subtractor 424, so as to obtain an output chroma pixel value corresponding to the Cb pixel value 404. The multiplier 425 multiplies the Cr pixel value 406 with the color adjustment ratio 415, and the multiplied result is then undergoes an operation of a subtractor 426, so as to obtain an output chroma pixel value corresponding to the Cb pixel value 406. Consequently, the outputs of the subtractors 422, 424 and 426 may compose the image 140.

Noteworthily, functions of the fourth circuit 364, the multiplier 421 and the subtractor 422 may be combined and written into the following equation (16), and functions of the fifth circuit 365, the multipliers 423, 425 and the subtractors 424, 426 may be combined and written into the following equation (17).

$$Y_{out}(x,y)=\{w\alpha(x,y)+(1-w)[p_9\cdot\alpha(x,y)+p_{10}]\}Y_{in}(x,y)-16w[\alpha(x,y)-1] \quad (16)$$

$$C_{out}^i(x,y)=[w\alpha(x,y)+(1-w)]C_{in}^i(x,y)-128w[\alpha(x,y)-1] \quad (17)$$

Wherein, $Y_{out}(x,y)$ is the output result of the input pixel at the $x^{th}$ row and the $y^{th}$ column in the image 140. $C_{in}^i(x,y)$ represents the Cb pixel value or the Cr pixel value, in YCbCr color space, of the input pixel at the $x^{th}$ row and the $y^{th}$ column in the image 140. $C_{out}^i(x,y)$ represents the Cb output chroma pixel value or the Cr output chroma pixel value, in YCbCr color space, of the input pixel at the $x^{th}$ row and the $y^{th}$ column in the image 120.

Figure 4:
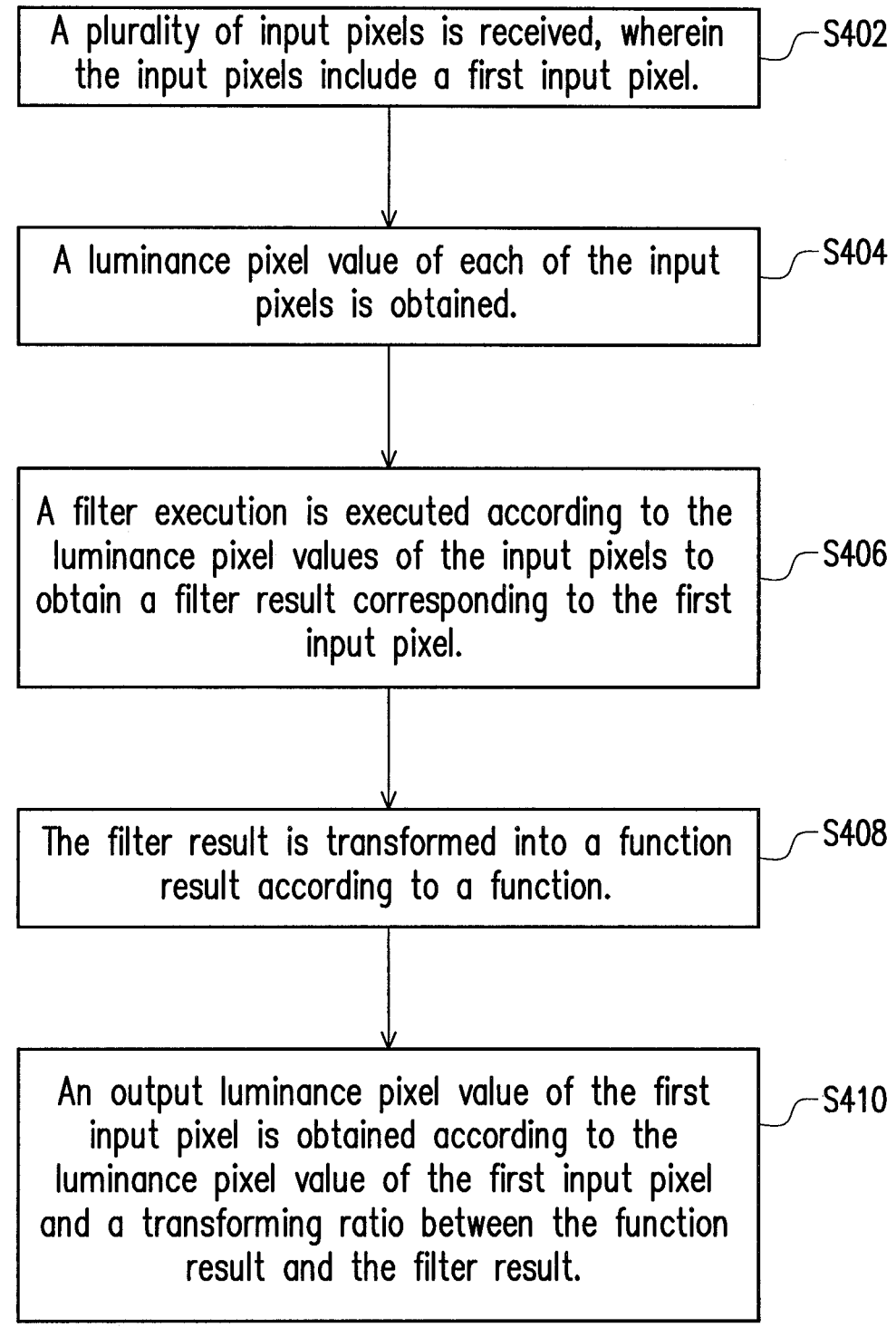
FIG. 4 is a flow chart diagram schematically illustrating a dynamic compression method for an image according to an exemplary embodiment.

FIG. 4 is a flow chart diagram schematically illustrating a dynamic compression method for an image according to an exemplary embodiment.

Referring to FIG. 4, in step S402, a plurality of input pixels is received, wherein the input pixels include a first input pixel. In step S404, a luminance pixel value of each of the input pixels is obtained. In step S406, a filter execution is executed according to the luminance pixel values of the input pixels to obtain a filter result corresponding to the first input pixel. In step S408, the filter result is transformed into a function result according to a function. In step S4010, an output luminance pixel value of the first input pixel is obtained according to the luminance pixel value of the first input pixel and a transforming ratio between the function result and the filter result. However, each step in FIG. 4 has been described in detail above, therefore it will not be repeated.

Second Embodiment

The second embodiment is similar to the first embodiment, and thus only differences between the two are described herein. In the second embodiment, a function of the pixel value adjustment circuit may be implemented as one or more lookup table for enhancing the execution speed.

Figure 5:
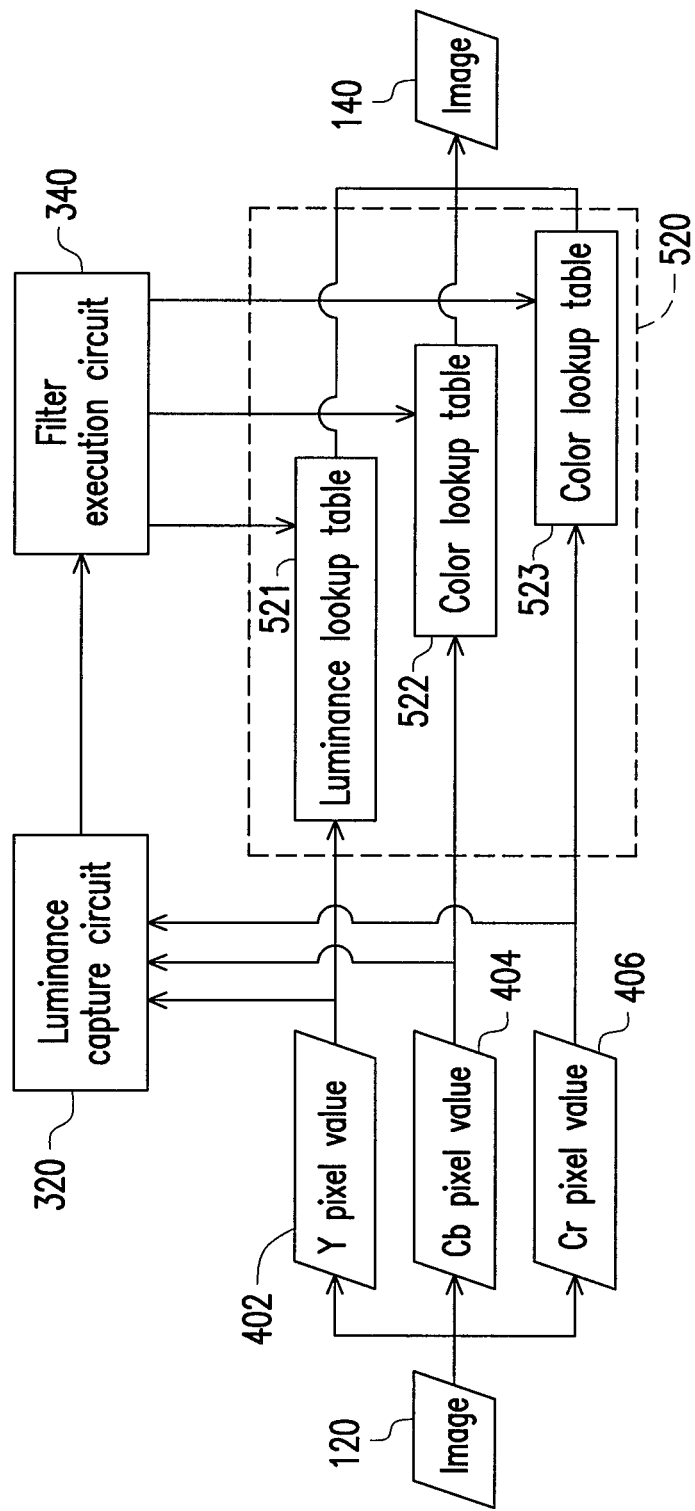
FIG. 5 is a block diagram schematically illustrating an image processing device according to a second embodiment.

FIG. 5 is a block diagram schematically illustrating an image processing device 500 according to a second embodiment.

Referring to FIG. 5, the image processing device 500 includes a luminance capture circuit 320, a filter execution circuit 340 and a pixel value adjustment circuit 520. Nevertheless, functions of the luminance capture circuit 320 and the filter execution circuit 340 are described in the first embodiment, so that it is not repeated herein.

The pixel value adjustment circuit 520 includes a luminance lookup table 521 and color lookup tables 522, 523. The luminance lookup table 521 is established according to the equation (16), and the color lookup tables 522, 523 are established according to the equation (17). Specifically, the equations (16) and (17) may be respectively rewritten as the following equations (18) and (19).

$$Y_{out}(x,y)= \quad (18)$$
$$\left\{\frac{wT[L_{in}^{avg}(x,y)]}{L_{in}^{avg}(x,y)}+(1-w)\left[\frac{p_9\cdot T[L_{in}^{avg}(x,y)]}{L_{in}^{avg}(x,y)}+p_{10}\right]\right\}Y_{in}(x,y)-$$
$$16w\left[\frac{T[L_{in}^{avg}(x,y)]}{L_{in}^{avg}(x,y)}-1\right]$$

$$C_{out}^i(x,y)=\left[\frac{wT[L_{in}^{avg}(x,y)]}{L_{in}^{avg}(x,y)}+(1-w)\right]C_{in}^i(x,y)- \quad (19)$$
$$128w\left[\frac{T[L_{in}^{avg}(x,y)]}{L_{in}^{avg}(x,y)}-1\right]$$

It may be known from equations (18) and (19) that w, p9 and p10 all are predetermined values and would not be altered in the present embodiment. Therefore, $L_{in}^{avg}(x,y)$, and $C_{in}^i(x,y)$ are the only variables, and the filter result $L_{in}^{avg}(x,y)$ is obtained by the filter execution circuit 340. Moreover, since the values of $Y_{in}(x,y)$ and $C_{in}^i(x,y)$ are within a fixed range (e.g., 0 to 255), results of equations (18) and (19) may be initially calculated and stored within a lookup table. In other words, the luminance lookup table 521 is configured to use $Y_{in}(x,y)$ and the filter result $L_{in}^{avg}(x,y)$ as input indexes, and to output the output result $Y_{out}(x,y)$ of an input pixel. Similarly, the color lookup table 522 is configured to use $C_{in}^i(x,y)$ (viz., the Cb pixel value 404) and the filter result $L_{in}^{avg}(x,y)$ as the input indexes, and to output the Cb output chroma pixel value of an input pixel. The color lookup table 523 is configured to use $C_{in}^i(x,y)$ (viz., the Cr pixel value 406) and the filter result $L_{in}^{avg}(x,y)$ as the input indexes, and to output the Cr output chroma pixel value of an input pixel.

Noteworthily, in the present embodiment, ranges of the Y pixel value 402, the Cb pixel value 404 or the Cr pixel value are consecutive integers of 0~255. Nevertheless, in other embodiments, the ranges may be quantified, so that the quantified ranges in the luminance lookup table 521 and the color lookup tables 522, 523 may be used as the input indexes, and the invention is not limited thereto.

In summary, the dynamic compression method and the image processing device provided in the embodiments of the invention may simultaneously perform the dynamic range compression, reserve the details in the image, retain the color information, and are able to quickly obtain the output image using the lockup tables. Nevertheless, the abovementioned advantages do not have to be included in other embodiments.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A dynamic range compression method for an image processing device, comprising:
   receiving a plurality of input pixels, wherein the input pixels comprise a first input pixel;
   obtaining a luminance pixel value of each of the input pixels;
   executing a filter execution according to the luminance pixel values of the input pixels to obtain a filter result corresponding to the first input pixel;
   transforming the filter result into a function result according to a function; and
   obtaining an output luminance pixel value of the first input pixel according to the luminance pixel value of the first input pixel and a transforming ratio between the function result and the filter result,
   wherein the output luminance pixel value is obtained according to:

$$L_{out}(x, y) = \{r(x, y)L_{in}(x, y)\}_0^1,$$

where $$r(x, y) = \frac{T[L_{in}^{avg}(x, y)]}{L_{in}^{avg}(x, y)},$$

wherein x and y are non-negative integers, $L_{in}(x,y)$ represents the luminance pixel value of the input pixel at the $x^{th}$ row and the $y^{th}$ column in an image, $L_{out}(x,y)$ represents the output luminance pixel of the input pixel at the $x^{th}$ row and the $y^{th}$ column in the image, $L_{in}^{avg}(x,y)$ represents the filter result corresponding to the input pixel at the $x^{th}$ row and the $y^{th}$ column in the image and is an average value, T[ ] is a continuous and first-order differentiable function, r(x,y) represents the transforming ratio between the function result and the filter result, and $\{L\}_0^1$ represents an operation which limits the value of L between a maximum value and a minimum value,
   wherein the luminance pixel value of each of the input pixels is further obtained according to a gain value and a correction value,
   wherein an output result of each of the input pixels and an output chroma pixel value of the first pixel in YCbCr color space are further obtained according to the gain value and the correction value.

2. The dynamic range compression method as recited in claim 1, wherein the step of obtaining the output luminance pixel value of the first input pixel according to the luminance pixel value of the first input pixel and the transforming ratio between the function result and the filter result comprises:
   obtaining a multiplication result by multiplying the transforming ratio with the luminance pixel value of the first input pixel; and
   adjusting the multiplication result according to a maximum value and a minimum value for obtaining the output luminance pixel value of the first input pixel, wherein the output luminance pixel value of the first input pixel is ranged between the maximum value and the minimum value.

3. The dynamic range compression method as recited in claim 1, wherein the step of transforming the filter result into the function result according to the function comprises:
   obtaining a first regularization parameter according to the filter result, an input pixels brightness maximum value, a minimum parameter, and a maximum parameter, wherein the minimum parameter and the maximum parameter are both greater than 0; and
   substituting the luminance pixel value of the first input pixel and the first regularization parameter into a hyperbolic tangent function, and obtaining the function result according to the output of the hyperbolic tangent function.

4. The dynamic range compression method as recited in claim 1, wherein the input pixels are comprised in an image, and the image comprises a plurality of columns and a plurality of rows, wherein the step of obtaining the luminance pixel value of each of the input pixels comprises:
   obtaining the luminance pixel value according to equations (1)~(4), $$L_{in}(x,y)=p_1 \cdot Y_{in}(x,y)+\max[\Delta C_r(x,y), \Delta C_{rb}(x,y), \Delta C_{rb}(x,y)] \quad (1)$$

$$\Delta C_r(x,y)=p_2 \cdot C_{in}^r(x,y)-p_3 \quad (2)$$

$$\Delta C_{rb}(x,y)=p_4-p_5 \cdot C_{in}^b(x,y)-p_6 \cdot C_{in}^r(x,y) \quad (3)$$

$$\Delta C_b(x,y)=p_7 \cdot C_{in}^b(x,y)-p_8 \quad (4)$$

wherein x and y are non-negative integers, $p_1$~$p_8$ are real numbers, $L_{in}(x,y)$ represents the luminance pixel value of the input pixel at the $x^{th}$ row and the $y^{th}$ column in the image, $Y_{in}(x,y)$ represents a Y pixel value, in YCbCr color space, of the input pixel at the $x^{th}$ row and the $y^{th}$ column in the image, $C_{in}^r(x,y)$ represents a Cr pixel value, in YCbCr color space, of the input pixel at the $x^{th}$ row and the $y^{th}$ column in the image, and $C_{in}^b(x,y)$ represents a Cb pixel value, in YCbCr color space, of the input pixel at the $x^{th}$ row and the $y^{th}$ column in the image.

5. The dynamic range compression method as recited in claim 1, wherein the input pixels are comprised in an image, and the image comprises a plurality of columns and a plurality of rows, wherein the dynamic compression method further comprises:
   obtaining the output result of each of the input pixels according to equation (5), $$Y_{out}(x,y)=\{w\alpha(x,y)+(1-w)[p_9 \cdot \alpha(x,y)+p_{10}]\}Y_{in}(x,y)-16w[\alpha(x,y)-1] \quad (5),$$

wherein w is a real number greater than 0 and smaller than 1, $p_9$ and $p_{10}$ are real numbers, $\alpha(x,y)$ is a ratio between the output luminance pixel value and the luminance pixel value of the input pixel at the $x^{th}$ row and the $y^{th}$ column in the image, $Y_{in}(x,y)$ represents a Y pixel value, in YCbCr color space, of the input pixel at the $x^{th}$ row and the $y^{th}$ column in the image, $Y_{out}(x,y)$ is the output result of the input pixel at the $x^{th}$ row and the $y^{th}$ column in the image.

6. The dynamic range compression method as recited in claim 5 further comprising:
   obtaining the output chroma pixel value of the first input pixel according to equation (6), $$C_{out}^i(x,y)=[w\alpha(x,y)+(1-w)]C_{in}^i(x,y)-128w[\alpha(x,y)-1] \quad (6),$$

wherein $C_{in}^i(x,y)$ represents a Cb pixel value or a Cr pixel value, in YCbCr color space, of the input pixel at the $x^{th}$ row and the $y^{th}$ column in the image, $C_{out}^i(x,y)$ represents a Cb output chroma pixel value or a Cr output chroma pixel value, in YCbCr color space, of the input pixel at the $x^{th}$ row and the $y^{th}$ column in the image.

7. The dynamic range compression method as recited in claim 6 further comprising:

establishing a luminance lookup table according to the equation (5), wherein input indexes of the luminance lookup table are the filter result and the Y pixel values, in YCbCr color space, of the input pixels; and establishing a color lookup table according to equation (6), wherein input indexes of the color lookup table are the filter result and the Cr pixel values or the Cb pixel values, in YCbCr color space, of the input pixels;

wherein the step of obtaining the output luminance pixel value of the first input pixel according to the luminance pixel value of the first input pixel and the transforming ratio between the function result and the filter result comprise:

obtaining the output result of the first input pixel according to the luminance lookup table, the luminance pixel value of the first input pixel and the filter result; and obtaining the Cb output chroma pixel value or the Cr output chroma pixel value of the first input pixel according to the color lookup table, the Cr pixel value or the Cb pixel value, in YCbCr color space, of the first input pixel and the filter result.

8. An image processing device comprising:

a luminance capture circuit, configured to receive a plurality of input pixels, wherein the input pixels comprise a first input pixel, and the luminance capture circuit is configured to obtain a luminance pixel value of each of the input pixels;

a filter execution circuit, coupled to the luminance capture circuit, configured to execute a filter execution according to the luminance pixel values of the input pixels to obtain a filter result corresponding to the first input pixel; and a pixel value adjustment circuit, coupled to the filter execution circuit, configured to transform the filter result into a function result according to a function, and obtain an output luminance pixel value of the first input pixel according to the luminance pixel value of the first input pixel and a transforming ratio between the function result and the filter result, wherein the output luminance pixel value is obtained according to equations (1) and equation (2), $$L_{out}(x, y) = \{r(x, y)L_{in}(x, y)\}_0^1,$$

where $$r(x, y) = \frac{T[L_{in}^{avg}(x, y)]}{L_{in}^{avg}(x, y)},$$

wherein x and y are non-negative integers, $L_{in}(x,y)$ represents the luminance pixel value of the input pixel at the $x^{th}$ row and the $y^{th}$ column in an image, $L_{out}(x,y)$ represents the output luminance pixel of the input pixel at the $x^{th}$ row and the $y^{th}$ column in the image, $L_{in}^{avg}(x,y)$ represents the filter result corresponding to the input pixel at the $x^{th}$ row and the $y^{th}$ column in the image and is an average value, $T[\ ]$ is a continuous and first-order differentiable function, $r(x,y)$ represents the transforming ratio between the function result and the filter result, and $\{L\}_0^1$ represents an operation which limits the value of L between a maximum value and a minimum value, wherein the luminance pixel value of each of the input pixels is further obtained according to a gain value and a correction value, wherein an output result of each of the input pixels and an output chroma pixel value of the first pixel in YCbCr color space are further obtained according to the gain value and the correction value.

9. The image processing device as recited in claim 8, wherein the pixel value adjustment circuit is further configured to obtain a multiplication result by multiplying the transforming ratio with the luminance pixel value of the first input pixel, and to adjust the multiplication result according to a maximum value and a minimum value for obtaining the output luminance pixel value of the first input pixel, wherein the output luminance pixel value of the first input pixel is ranged between the maximum value and the minimum value.

10. The image processing device as recited in claim 8, wherein the pixel value adjustment circuit is configured to obtain a first regularization parameter according to the filter result, an input pixels brightness maximum value, a minimum parameter, and a maximum parameter, wherein the minimum parameter and the maximum parameter are both greater than 0; and the pixel value adjustment circuit is further configured to substitute the luminance pixel value of the first input pixel and the first regularization parameter into a hyperbolic tangent function, and obtain the function result according to the output of the hyperbolic tangent function.

11. The image processing device as recited in claim 8, wherein the input pixels are comprised in an image, and the image comprises a plurality of columns and a plurality of rows, wherein the pixel value adjustment circuit is also configured to obtain the luminance pixel value of each of the input pixels according to equations (1)~(4), $$L_{in}(x,y)=p_1 \cdot Y_{in}(x,y)+\max[\Delta C_r(x,y),\Delta C_{rb}(x,y), \Delta C_{rb}(x,y)] \quad (1)$$

$$\Delta C_r(x,y)=p_2 \cdot C_{in}^r(x,y)-p_3 \quad (2)$$

$$\Delta C_{rb}(x,y)=p_4-p_5 \cdot C_{in}^b(x,y)-p_6 \cdot C_{in}^r(x,y) \quad (3)$$

$$\Delta C_b(x,y)=p_7 \cdot C_{in}^b(x,y)-p_8 \quad (4)$$

wherein x and y are non-negative integers, $p_1$~$p_8$ are real numbers, $L_{in}(x,y)$ represents the luminance pixel value of the input pixel at the $x^{th}$ row and the $y^{th}$ column in the image, $Y_{in}(x,y)$ represents a Y pixel value, in YCbCr color space, of the input pixel at the $x^{th}$ row and the $y^{th}$ column in the image, $C_{in}^r(x,y)$ represents a Cr pixel value, in YCbCr color space, of the input pixel at the $x^{th}$ row and the $y^{th}$ column in the image, and $C_{in}^b(x,y)$ represents a Cb pixel value, in YCbCr color space, of the input pixel at the $x^{th}$ row and the $y^{th}$ column in the image.

12. The image processing device as recited in claim 8, wherein the input pixels are comprised in an image, and the image comprises a plurality of columns and a plurality of rows, wherein the pixel value adjustment circuit is also configured to obtain the output result of each of the input pixels according to equation (5), $$Y_{out}(x,y)=\{w\alpha(x,y)+(1-w)[p_9 \cdot \alpha(x,y)+p_{10}]\}Y_{in}(x,y)-16w[\alpha(x,y)-1] \quad (5),$$

wherein w is a real number greater than 0 and smaller than 1, $p_9$ and $p_{10}$ are real numbers, $\alpha(x,y)$ is a ratio between the output luminance pixel value and the luminance pixel value of the input pixel at the $x^{th}$ row and the $y^{th}$ column in the image, $Y_{in}(x,y)$ represents a Y pixel value, in YCbCr color space, of the input pixel at the $x^{th}$ row and the $y^{th}$ column in the image, $Y_{out}(x,y)$ is the output result of the input pixel at the $x^{th}$ row and the $y^{th}$ column in the image.

13. The image processing device as recited in claim 12, wherein pixel value adjustment circuit is further configured to obtain the output chroma pixel value of the first input pixel according to equation (6), $$C_{out}^{i}(x,y)=[w\alpha(x,y)+(1-w)]C_{in}^{i}(x,y)-128w[\alpha(x,y)-1] \quad (6),$$

wherein $C_{in}^{i}(x,y)$ represents a Cb pixel value or a Cr pixel value, in YCbCr color space, of the input pixel at the $x^{th}$ row and the $y^{th}$ column in the image, $C_{out}^{i}(x,y)$ represents a Cb output chroma pixel value or a Cr output chroma pixel value, in YCbCr color space, of the input pixel at the $x^{th}$ row and the $y^{th}$ column in the image.

14. The image processing device as recited in claim 13, wherein pixel value adjustment circuit comprises:
- a luminance lookup table established according to equation (5), wherein input indexes of the luminance lookup table are the filter result and the Y pixel values, in YCbCr color space, of the input pixels, and the output of the luminance lookup table is the output result of the input pixels; and
- a color lookup table established according to equation (6), wherein input indexes of the color lookup table are the filter result and the Cr pixel values or the Cb pixel values, in YCbCr color space, of the input pixels, and the output of the color lookup table is the Cb output chroma pixel value or the Cr output chroma pixel value of the input pixels.

* * * * *